United States Patent [19]
Bender

[11] 3,724,614
[45] Apr. 3, 1973

[54] COMPRESSION FASTENER
[75] Inventor: John R. Bender, South Bend, Ind.
[73] Assignee: The Bendix Corporation, South Bend, Ind.
[22] Filed: June 9, 1971
[21] Appl. No.: 151,451

[52] U.S. Cl..............188/218 XL, 85/37, 192/107 R, 287/189.36 D
[51] Int. Cl......F16b 19/06, F16d 13/62, F16d 65/10
[58] Field of Search ......85/37, 39, 50 R, 84, 9 R, 77; 188/234, 251 R, 251 M, 251 A, 218 XL; 287/189.36 D, 189.36 F, 189.36 K, 101, 73.2; 16/2, 3; 151/31, 38; 192/107 R

[56] References Cited

UNITED STATES PATENTS

| | | | |
|---|---|---|---|
| 2,678,585 | 5/1954 | Ellis | 85/50 R X |
| 1,232,274 | 7/1917 | Gay | 85/77 |
| 2,525,117 | 10/1950 | Campbell | 85/77 |
| 2,833,325 | 5/1958 | Laisy | 85/9 R X |
| 2,835,367 | 5/1958 | Steck | 188/234 X |

FOREIGN PATENTS OR APPLICATIONS

| | | | |
|---|---|---|---|
| 570,864 | 2/1959 | Canada | 188/251 R |

Primary Examiner—Ramon S. Britts
Attorney—Gordon H. Chenez and Plante, Hartz, Smith & Thompson

[57] ABSTRACT

Fastening means including a circular insert adapted to fit into a mating opening of a segment of brittle material and fixedly secure same to a relatively stiff backing member. The insert has a sleeve portion and integral head and shoulder portions. The head portion is funnel shaped with its inner included angle greater than its outer included angle. A plurality of radially extending slots in the head portion permit radially outward flexing thereof. The outer included angle of the head portion is greater than the included angle of the mating opening and contact therebetween is established substantially simultaneously with engagement of the shoulder portion with the backing member. A rivet or similar fastening member extending through the insert exerts an axially directed force thereon causing the head portion to flex thereby progressively increasing the contact area between the head portion and adjacent wall of the mating opening to draw the segment into contact with the backing member with a minimum of bending force.

7 Claims, 6 Drawing Figures

PATENTED APR 3 1973 3,724,614
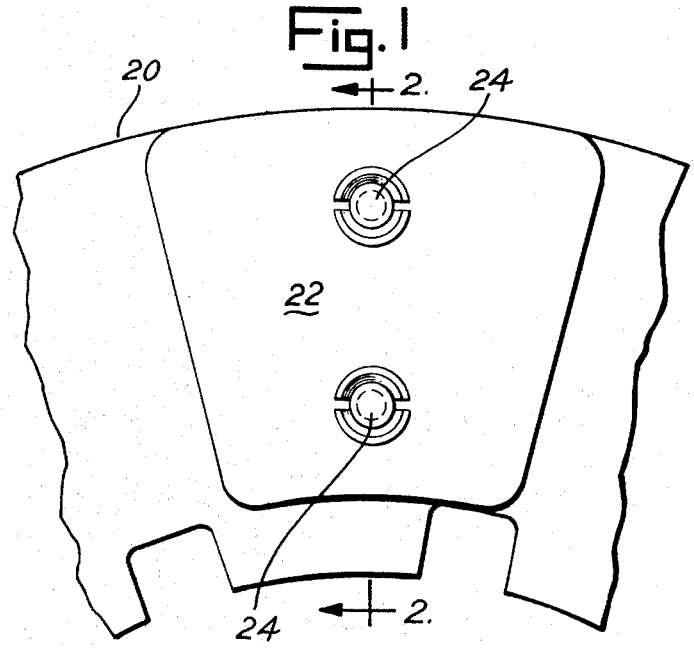
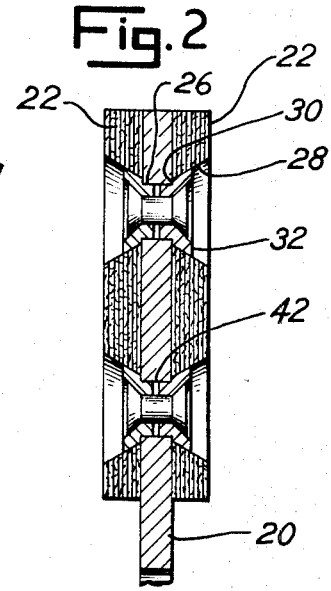
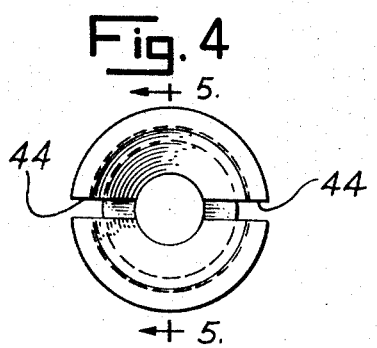
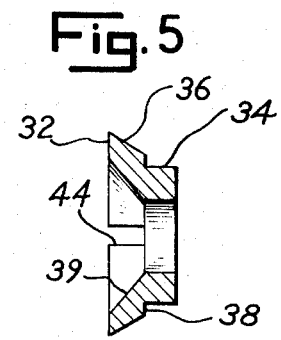
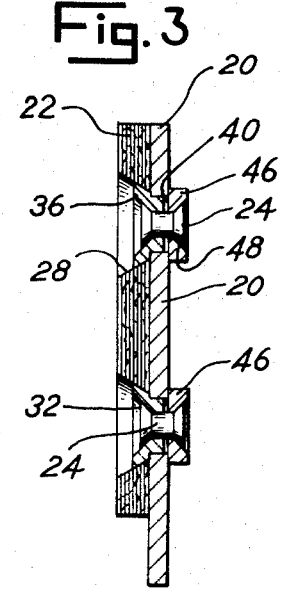
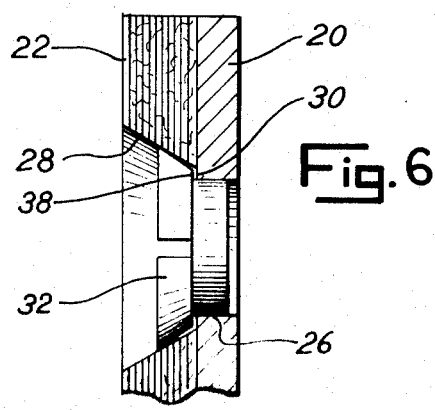
INVENTOR.
JOHN R. BENDER
BY
Gordon N. Cheney
AGENT

COMPRESSION FASTENER

BACKGROUND OF THE INVENTION

Brittle materials such as graphite, carbon, ceramics, etc., are characteristically weak in bending but resistant to compression thereby presenting fastener problems in applications where it is desired to fixedly secure such material to a relatively stiff backing member. For example, reference is made to U.S. Pat. No. 2,516,966 issued Aug. 1, 1950 to W. H. DuBois (common assignee) wherein segments of friction material are riveted to a disc brake rotor or stator. It has been found that the bending forces imposed on the friction material by the rivet tend to cause cracks in the region of the rivet thereby producing premature failure of the segment during braking operations.

SUMMARY OF THE INVENTION

The present invention relates to fastening means for use with countersunk rivets or the like for fixedly securing relatively brittle material to a plate or like backing member.

It is an object of the present invention to provide a generally conical-shaped, flexible insert for a rivet receiving opening in a brittle material secured to a relatively stiffer backing member.

It is an important object of the present invention to provide a generally conical-shaped, flexible insert for a rivet receiving opening in a relatively brittle material adapted to be fixedly secured to a backing member wherein bending force exerted by the rivet on the brittle material is minimized.

It is an important object of the present invention to provide fastening means for fixedly securing lining material to a rotor or stator of a conventional disc brake.

BRIEF DESCRIPTION OF THE DRAWINGS

FIG. 1 is a schematic representation of a portion of an annular brake stator embodying the present invention.

FIG. 2 is a section view taken on line 2—2 of FIG. 1.

FIG. 3 is a section view similar to FIG. 2 but with segments on one side only.

FIG. 4 is an enlarged view of the fastening insert.

FIG. 5 is a section view taken on line 5—5 of FIG. 4.

FIG. 6 is an enlarged view of a portion of FIG. 3 showing the fastening insert in position prior to riveting.

DESCRIPTION OF THE PREFERRED EMBODIMENT

Referring to FIG. 1 in particular, numeral 20 designates a portion of an annular steel rotor or stator disc of a conventional multiple disc aircraft brake. A plurality of spaced-apart segments of lining material 22, only one of which is shown, is fixedly secured to one face of the rotor or stator 20. A similar plurality of spaced-apart segments 22 may be fixedly secured to the opposite face of the rotor or stator 20 thereby providing friction lining on both sides thereof. A pair of spaced-apart rivets or similar fastening members 24 fixedly secure each segment or pair of opposed segments to the rotor or stator 20.

Referring to FIG. 2, the rotor or stator 20 is provided with suitable openings 26 adapted to receive rivets 24. The segments 22 are each provided with conical-shaped openings 28 having a smaller diameter slightly larger than the diameter of associated opening 26 aligned therewith to define a shoulder portion 30 on rotor or stator 20.

Referring to FIG. 5 in particular, an annular insert 32 is provided with a cylinder portion 34 and a radially diverging annular head or wall portion 36 which terminate at an annular shoulder 38. The head or wall portion 36 is countersunk as by conical opening 39, the wall of which has an included angle in excess of that of the outer conical wall or head or wall portion 36. The cylinder portion 34 is received by opening 26 and extends therethrough a predetermined distance which is less than the thickness of rotor or stator 20. In the case of segments 22 lining one surface of rotor or stator 22, the cylinder portion 34 terminates short of the opposite surface of rotor or stator 20 to define a clearance 40. In the case of segments 22 lining both surfaces of rotor or stator 20, the cylinder portions 34 of opposite inserts 22 are shortened accordingly to define clearance 42 therebetween.

The head portion 36 has a plurality of circumferentially spaced-apart, radially extending slots 44 which terminate at shoulder 38 to provide radial resiliency to the radially diverging head portion 36 as will be described. Two diametrically opposed slots 44 are shown, but it will be recognized that additional slots may be provided.

The outer angle of divergence of the head portion 36 is slightly greater than the angle of divergence of conical openings 28 as, for example, 61° vs. 60°, respectively, such that contact between the largest diameter section of head portion 36 and diverging wall of opening 28 occurs slightly before or simultaneously with shoulder 38 bottoming against shoulder portion 30 as indicated in FIG. 6.

Referring to FIGS. 3 and 6, a segment 22 is shown secured to one side of rotor or stator 20. A rivet 24 is inserted in insert 32 with the stem thereof extending through cylinder portion 34 and a back-up washer 46 having a conical opening 48 therein. The rivet 24 is upset by conventional rivet setting mechanism, not shown, against back-up washer 46 thereby loading insert 32 against the rotor or stator 20 by virtue of shoulder 38 contacting shoulder 30 and forcing the head portion 36 to flex radially outwardly and progressively impose a compression load along the wall of opening 28 to draw segment 22 against rotor or stator 20.

Referring to FIG. 2, oppositely disposed segments 22 on rotor or stator 20 are suitably aligned with opening 26. Each segment 22 is provided with an insert 32 the shoulder 38 of which bottoms against the respective shoulder 30 of rotor or stator 20 thereby establishing a spaced-apart relationship between adjacent ends of the inserts 32. As shown in FIG. 1, the insert 32 may be positioned to align slots 44 radially with respect to rotor or stator 20. A rivet 24 inserted from either segment 22 extends through aligned inserts 32 and is upset by suitable rivet upsetting mechanism, not shown, to draw the segments 22 tightly in position against rotor or stator 20.

As the rivet 24 is upset, the forces imposed on the head portions 36 by the cone-shaped rivet heads cause the arcuate segments of head portion 36 between slots 44 to flex progressively radially outwardly into contact with the wall of conical opening 28 thereby progressively imposing a compression load along the wall of opening 28 to fixedly secure the segments 22 against rotor or stator 20.

It will be understood that the insert 32 may be used in conjunction with a fastener other than rivet 24 as, for example, a screw, bolt and nut, or the like.

I claim:

1. A fastened assembly including fastener means securing brittle material to a relatively stiff backing member comprising in combination:
   brittle material having a conical countersunk opening therein;
   a stiff backing member having an opening therein having a diameter smaller than the minor diameter of said countersunk opening to define a shoulder portion on said backing member;
   an annular insert having a countersunk head portion including means rendering said head radially flexible, said head portion seated upon the wall of said countersunk opening, a sleeve portion mated with said opening in said backing member, and a radially extending shoulder separating said head and sleeve portions and bearing against said shoulder portion; and
   a fastening member extending through said insert and having a conical end portion engaging said countersunk head portion whereby said material is drawn into engagement with said backing member;
   said head portion being flexed radially outwardly by said fastening member and progressively imposing a compressive force along the wall of said countersunk opening in said brittle material.

2. A fastened assembly, as claimed in claim 1, wherein:
   said head portion is provided with a conical outer wall having an included angle initially greater than the included angle of said countersunk opening;
   said head portion having a plurality of radially extending slots formed therein to permit radially outward flexing of said head portion in response to force imposed thereon by said fastening member.

3. A fastened assembly, as claimed in claim 2, wherein:
   said radially extending shoulder engages said shoulder portion on said backing member simultaneously with engagement of said conical outer wall and said countersunk opening.

4. A fastened assembly, as claimed in claim 1, wherein:
   said countersunk head portion has a conical opening receiving said end portion of said fastening member.

5. A fastened assembly, as claimed in claim 1, wherein:
   said countersunk head portion has conical inner and outer walls;
   said inner wall having an included angle initially greater than the included angle of said outer wall.

6. A fastened assembly, as claimed in claim 1, wherein the backing member and brittle material define an annular brake disc and flat friction segment, respectively, and wherein:
   said friction segment is secured to one side of said annular brake disc;
   said fastening member is a rivet extending through said insert and a backing washer engaging the opposite side of said annular brake disc;
   said rivet having opposite end portions bearing against said head portion and said backing washer.

7. A fastened assembly, as claimed in claim 1, wherein the backing member and brittle material define an annular brake disc and flat friction segments, respectively, and wherein:
   said friction segments are secured to opposite sides of said annular brake disc;
   said fastening member is a rivet extending through said friction segments and having opposite end portions each of which bear against said head portion of an associated one of said inserts.

* * * * *